United States Patent [19]

Wolf

[11] 4,013,497
[45] Mar. 22, 1977

[54] METHOD AND APPARATUS FOR DELABELING

[75] Inventor: William D. Wolf, Simsbury, Conn.

[73] Assignee: Monsanto Company, St. Louis, Mo.

[22] Filed: July 31, 1975

[21] Appl. No.: 600,605

[52] U.S. Cl. .............................. 156/154; 15/21 D; 15/59; 51/DIG. 17; 156/344; 156/584; 198/478; 241/99;

[51] Int. Cl.² ..................................... B32B 31/18

[58] Field of Search ........ 241/99; 51/290, DIG. 17; 156/584, 344, 154; 198/22 B; 15/21 D; 59, 60

[56] References Cited

UNITED STATES PATENTS

| | | | |
|---|---|---|---|
| 518,275 | 4/1894 | Rantz | 15/67 |
| 568,685 | 9/1896 | Irrgang | 15/61 |
| 803,850 | 11/1905 | Prince | 15/59 |
| 1,023,074 | 4/1912 | Garnor et al. | 198/22 B |
| 1,158,752 | 11/1915 | Volz | 156/584 |
| 1,960,530 | 5/1934 | Doering et al. | 15/70 |
| 2,347,453 | 4/1944 | Becker | 15/60 |
| 2,516,998 | 8/1950 | Kimball et al. | 15/101 |
| 2,558,255 | 6/1951 | Johnson et al. | 241/99 |
| 2,700,510 | 1/1955 | Wagner | 241/99 |

*Primary Examiner*—Edward G. Whitby
*Attorney, Agent, or Firm*—Michael J. Murphy

[57] ABSTRACT

Mechanical delabeling apparatus includes a slotted tubular feed conduit containing drive belts, an open delabeling zone at the end of the conduit circumscribed by adjacent, circularly arranged members comprising an abrading wheel, an article turning wheel and a yieldably biased set of spherical rollers. The dry process includes sequentially driving labeled bottles into the delabeling zone, rotating them about their lengthwise axes prior to and during contact with the abrading wheel while yieldably transversely supporting them in such zone and air conveying labels and adhesive materials from the zone as removed from the bottles.

18 Claims, 5 Drawing Figures

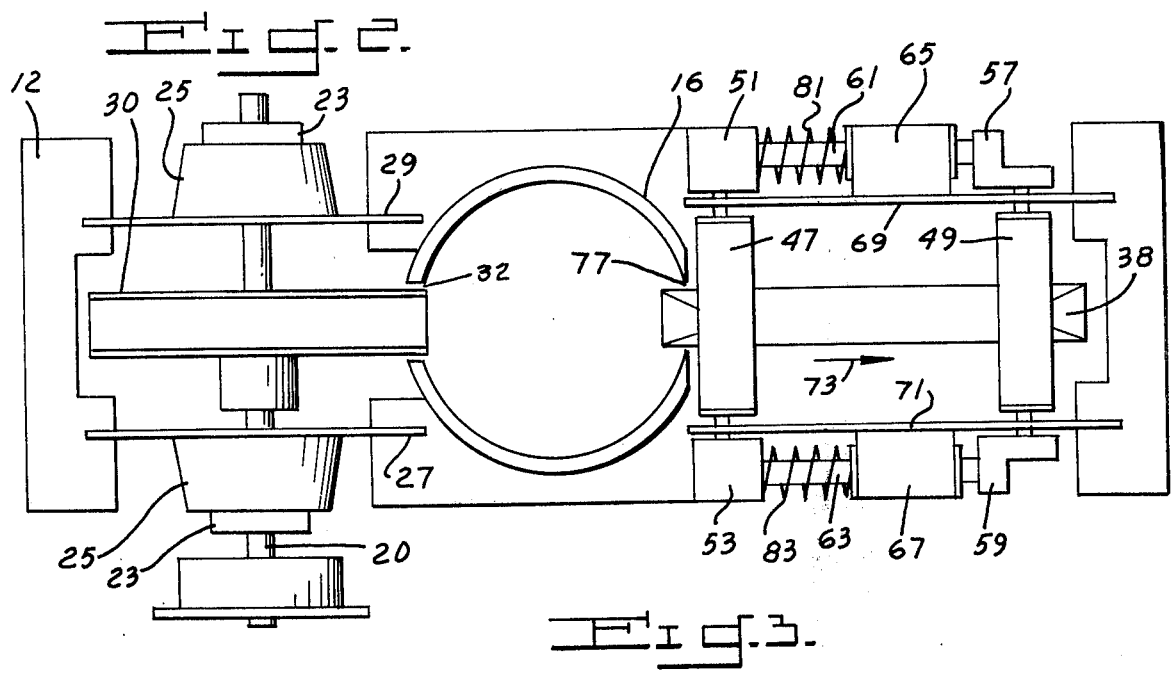
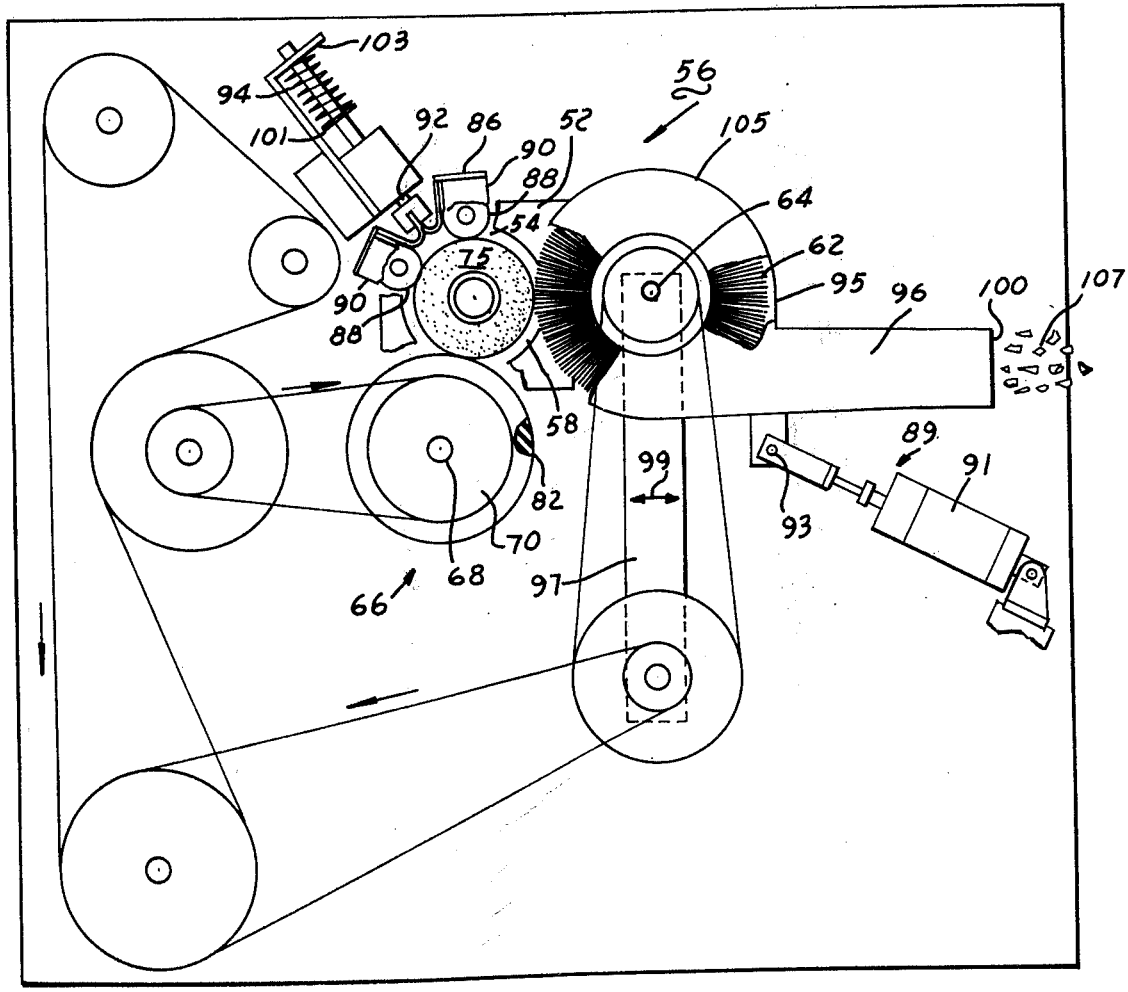

METHOD AND APPARATUS FOR DELABELING

BACKGROUND OF THE INVENTION

This invention relates to delabeling articles and more particularly to a method and apparatus for delabeling lightweight plastic bottles intended for subsequent processing through a plastics reclamation system.

In reclaiming or recycling plastics for reuse, labels must be removed and segregated to avoid contamination. This may be done by soaking or washing the labeled articles, provided washable label adhesives and wettable labels are used. However, when impervious or non-wettable labels are used, for example, those containing aluminum foil, or formed of or coated with plastic, and/or adhesives are used which do not readily dissolve or may even be completely insoluble in conventional washing liquids, the labels, and preferably the adhesive material also, must be removed mechanically.

SUMMARY OF THE INVENTION

Now, a delabeling method and apparatus has been developed for use with hollow plastic articles such as containers intended for reclamation.

Accordingly, it is a principle object of this invention to provide a process and apparatus for delabeling hollow thermoplastic articles such as containers.

Another object is to provide such a process and apparatus which is capable of operating dry and of also removing label adhesives from the article surface.

A further object is to provide an apparatus having the aforementioned characteristics which is capable of automatic operation.

Other objects will in part be obvious and will in part appear from the following description and claims.

These and other objects are accomplished by providing delabeling apparatus comprising a pair of driven endless belts defining a feed passage between them and circularly arranged means circumscribing a delabeling zone open to said passage including a rotatably driven abrading member, a rotatably driven turning member and force-applying means.

Also provided is a dry process for delabeling non-reusable, axially symmetrical containers comprising the steps of sequentially inserting the containers lengthwise to a tubular feed passage, driving them in the direction of their longitudinal axes along the feed passage toward a delabeling zone, rotating them about their axes after reaching said zone, abrading labels therefrom in the delabeling zone during such rotation, supporting the containers in a direction substantially perpendicular to their axes during such abrading and rotating, and air conveying the removed labels from the delabeling zone as released from the containers.

BRIEF DESCRIPTION OF THE DRAWINGS

In describing the invention, reference will be made to the accompanying drawings wherein:

FIGS. 2, 3 and 4 are partially schematic, sectional views at 2—2, 3—3 and 4—4 of FIG. 1 respectively.

DETAILED DESCRIPTION OF THE ILLUSTRATED EMBODIMENT

Figure 1:
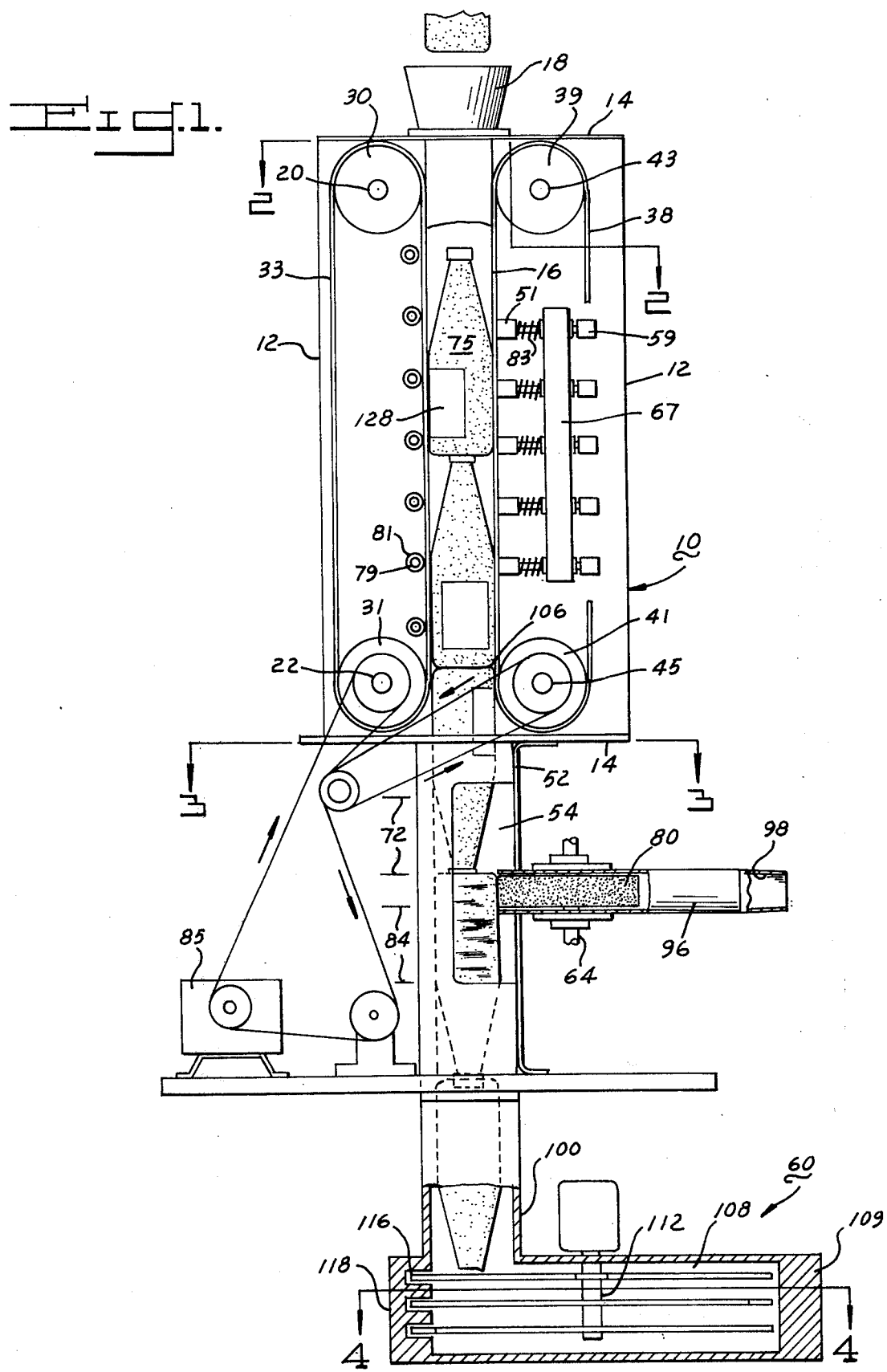
FIG. 1 is a vertical, central, sectional view of apparatus embodying the invention.

Referring now to the drawings, there is shown in FIG. 1, delabeling apparatus generally identified as 10, which includes a rectangular housing having four side plates 12 and two end plates 14 enclosing and supporting a cylindrical tubular conduit 16 which in turn supports feed hopper 18 at its upper end. Tube 16 may vary in length from that shown but should ordinarily be at least about 50 cm. long in order to accommodate a plurality of articles to be delabeled, and is preferably oriented substantially vertically as shown in FIG. 1, though such orientation alternatively could be in any direction. Vertically spaced, laterally fixed stub shafts 20, 22 (FIG. 1) are journaled in bearings 23 (FIG. 2) contained in a housing 25 carrried by a pair of laterally spaced support plates 27, 29 extending the greater part of the length of the housing. Sheaves 30, 31 are secured to and rotate with shafts 20, 22 and carry an endless feed or drive belt 33 received in lengthwise slot 32 in conduit 16 such that the inner run of belt 33 closest the axis of tube 16 partially overlaps the open cross section of conduit 16 and extends along the length thereof. A self-adjusting, endless feed or drive belt 38 (FIGS. 1 and 2) is opposite and yieldably loaded toward belt 33 with both such belts forming a feed passage between them for the articles to be delabeled. Belt 38 is also supported from a pair of vertically spaced sheaves 39, 41 which are rigid with upper and lower journaled shafts 43, 45. A series of laterally movable, vertically spaced support rollers, one set being shown at 47, 49 in FIG. 2, support belt 38 along its length and are each journaled in front tie blocks 51, 53 and rear tie blocks 57, 59 respectively. The roller axles extend through transverse slots (not shown) in side plates 69, 71 into front tie blocks 51, 53 and rear tie blocks 57, 59 respectively, to permit movement of such rollers toward and away from the axis of tube 16 in a manner to be described. Pins 61, 63 slidably pass through guide holdes in elongated, vertical rigid support blocks 65, 67 supported by mounting plates 69, 71. Compression return springs 81, 83 wedged between support blocks 65, 67 on one side and front tie blocks 51, 53 on the other side yieldably urge each pair of belt support rollers 47, 49 toward conduit 16, thus also placing drive belt 38 via elongated slot 77 in conduit 16 within the open cross section of the latter. When a lateral force in the direction of arrow 73 is applied against drive belt 38 because of frictional interfering rubbing contact with the side wall of bottle 75, each pair of rollers 47, 49, and therefore the portions of belt 38 with which they are in supportive contact, are forcibly urged to the right in FIG. 2 as a unit, thus maintaining tension in belt 38 and frictional driving contact with the wall of bottle 75. Laterally rigid shafts such as 79 (FIG. 1) carrying additional belt support rollers 81 aligned opposite the yieldably mounted rollers 47 may be provided for supporting belt 33 on the left side of tube 16. Rotative power for driving belts 33, 38 is conventionally provided by a suitable prime mover such as an electric motor 85 (FIG. 1) and an associated mechanically coupled transmission chain and sprockets, the operation of which is believed apparent from FIG. 1.

A fairly rigid, elongated block 52 (FIG. 1) having lengthwise slots 54 in its sidewalls is secured at the bottom of, and has a hollow interior coaxial with tube 16. Circularly arranged means, collectively indicated at 56 (FIG. 3), located below tube 16 circumscribe a delabeling zone 58 which is open at its upper end to the interior of tube 16 and at its lower end to shredding means 60 which will be described.

Means 56 (FIG. 3) extend generally transverse to the axis of zone 58 and include one or more vertically spaced abrading members mounted to rotatably driven shaft 64 positioned around a first segment of delabeling zone 58. Member 80 may vary in detail and in the illustrated embodiment comprises a circular brush with rigid bristles 62. Member(s) 80 preferably is yieldably mounted toward delabeling zone 58 via an air spring 89 comprising a normally forwardly biased piston within a conventional cylinder 91 including a rod having a clevis on its forward end pivotally secured at 93 to a suitable bracket bolted to scroll 95 which in turn is mounted to cantilevered support member 97 which is free to move in the direction of arrows 99 depending on the force or lack of force encountered by bristles 62.

Means 56 further includes a rotatably driven turning member 66 arcuately spaced from abrading member 80 and also conventionally secured for rotation on a journaled shaft 68. Member 66 comprises a cylindrical roller 70 having a resilient outer surface 82 extending at 72, 84 (FIG. 1) above and below the vertical extremities of brush 80.

Means 56 further includes force-applying means comprising a yieldably biased abutment arcuately spaced from and situated between turning member 66 and abrading member 80, which in the illustrated embodiment includes winged clip 86 mounting supports 90 carrying a plurality, for example two adjacent pairs, of journaled spherical rollers 88 freely movable in all directions. Bracket 86 is secured to a shaft 92, which is yieldably urged forward toward zone 58 via a compression spring 94 wedged between stop plate 103 and a collar 101 rigid with shaft 92.

Conduit 96 has a hollow interior 98 (FIG. 1) communicating at end 100 (FIG. 3) with a source of negative pressure which is exerted on delabeling zone 58 via scroll-shaped duct 105 at its opposite end which is open to zone 58 and closely surrounds without touching abrading member 80. Thus, when shaft-mounted brush 80 moves incrementally forward toward or rearward from delabeling zone 58, the air spring piston and rod support member 97 and conduit 96 likewise all move together as a unit.

Figure 4:
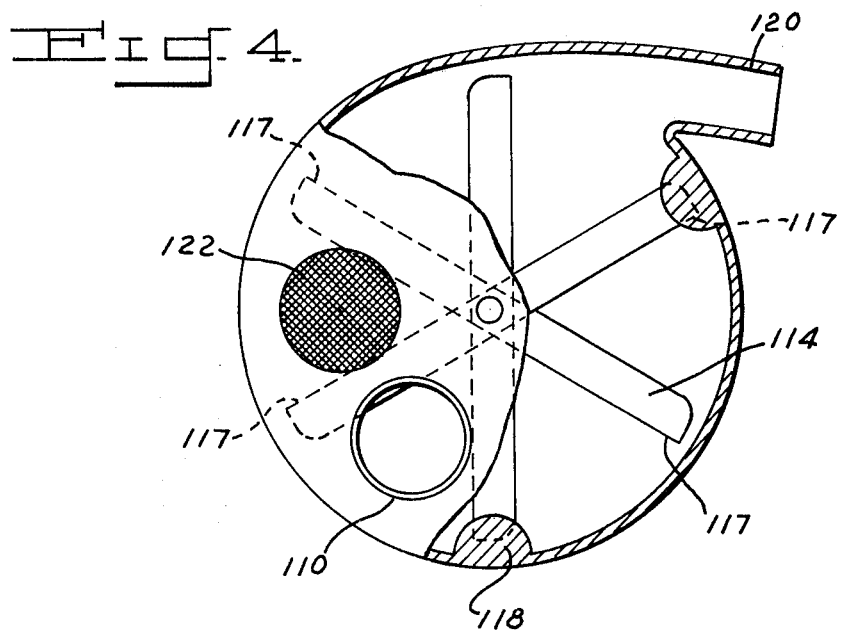

Shredding means 60 is preferably integrally associated with and situated below delabeling apparatus 10, but may alternatively be provided as a completely separate unit close to or well separated from delabeling aparatus 10. Means 60 comprises shaft 112 carrying a plurality of vertically separated blades 114 (FIG. 4), revolvable slots 116 formed in circularly spaced members 118. Delabeled bottles are shredded via impacting contact between sharp leading edges 117 of high speed rotating blades 114 and the surfaces of members 118. Housing 109 of shredding means 60 is circular in contour and opens downstream via outlet 120 to a suitable recovery unit such as a cyclone separator, not shown, for separating the shredded material from conveying air entering through screened inlet duct 122 which is open to the atmosphere.

From a process standpoint, there is provided a preferably completely dry method of delabeling, non-reusable, axially symmetrical containers such as the bottles illustrated at 75 in FIG. 1. Such containers, however, may vary in size and contour from the bottle shown, but are preferably formed of a lightweight, resilient thermoplastic material. Weight should preferably be between about 15 to 200 grams for good control during delabeling and to avoid the article progressing through the system too rapidly under the influence of gravity. Also, the plastic preferably should have a flexural elastic modulus of at least about $7 \times 10^3$ kg/cm² as measured by ASTM test method D790-71, in order to be sufficiently rigid to avoid excessive collapse of the wall when stressed. In this last respect, if the plastic is too pliable during passage through the system, the wall will tend to collapse under the influence of the yieldably mounted members around and projecting into the delabeling zone, and effective label removal will be inhibited.

Containers 75 are sequentially inserted lengthwise, either manually or automatically, into the system via hopper 18, either open end up or down as desired, and fall by gravity seriatim into the tubular feed passage until contacted by linearly driven belts 33 and 38 which then positively advance or drive the containers via frictional contact with same downwardly in the direction of their longitudinal axes sequentially along and generally parallel to the longitudinal axis of the feed passage toward delabeling zone 58. Should the size of the axially symmetrical container be somewhat greater than the lateral distance between opposing belts, belt 38, via the resilient transverse mounting previously described, is urged or shifted rearwardly in the direction of arrow 73 in FIG. 2 by the wall of the bottle away from the feed passage. Thus, such resilient belt mounting provides flexibility in the size of container which can be handled by the system while providing for positive frictional driving advancement. The forwardmost bottle enters delabeling zone 58 and, when fed open end up, heel portion 106 initially contacts resilient surface 82 of rotating turning member 66 which imparts rotation to the container about its axis after reaching delabeling zone 58 but incrementally before heel 106 contacts the abrading member. Such rotatable engagement is relatively high, i.e. between about 10 to 100 rpm, preferably in the same direction as that of the abrading member and continuing all during the removal process. Such rotation, however, may alternatively be opposite from that of the abrading member. Continued captive urging into the delabeling zone via the next rearmost bottle being driven forwardly by the belts eventually brings the bottle sidewall successively vertically into abrasive contact with rigid bristles 62 of the abrading wheel. When such bristles reach label material 128 which, in the illustrated embodiment contains a metallic, for example aluminum, foil outer layer, it is abraded off the bottle surface via rotating contact with the bristles, as is the majority of the adhesive material between the label and the container surface. During such removal, the side wall of the container is rotating and advancing linearly while in contact with rollers 88 which accommodate such dual directional movement and support the containers in a radial direction substantially perpendicular to their lengthwise axis during abrading removal of labels and adhesive material. Because of the free movement of such rollers, support is continued even as the forward end of the article is axially advanced out of the delabeling zone. Thus, the labels and adhesive material are forcibly rotated against the high speed rigid rotating brush bristles to remove them, whereupon, as shown at 107, the removal label shreds and adhesive globs are air conveyed away to a suitable disposal area via the negative pressure introduced into the delabeling zone through duct 96 immediately on being released from the container surface. The fluid cushion providing about 45 to 18 kg. force via air spring 89 maintains surface to surface engagement between bristles 62 and the labeled and/or coated container surface yet accommodates some variability in the diameter of the containers being handled. It should be realized that labels not adhering directly to the bottle surface, e.g. a wrap around version tightly drawn against the bottle surface without an adhesive may be removed equally as well by the technique of the invention. For that matter, various types of article coatings, for example those of impact absorbing materials and the like may also be removed.

Figure 5:
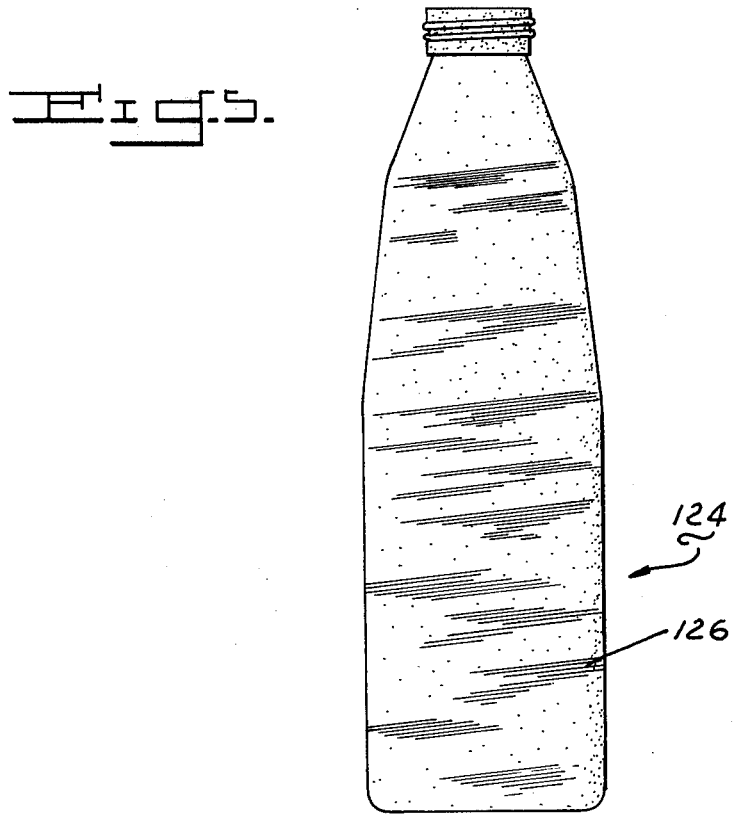
FIG. 5 is a front elevational view of a bottle delabeled according to the invention.

A delabeled bottle is shown in FIG. 5 at 124, such bottle being non-reusable because of helical abrasion marks 126 formed in the surface thereof but nevertheless free of all surface contaminants and ready to be fed to a plastics reclaim system.

In the illustrated embodiment, when the rearmost end of the container being delabeled is beyond the influence of rotating member 66, it drops by gravity in a delabeled state out of delabeling zone 58 and preferably through feed tube 110 directly into container size-reducing zone 108 (FIG. 1) where it is reduced in size and conveyed away by shredding means 60 as previously described.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

I claim:
1. Delabeling apparatus comprising:
   A. a pair of driven endless belts defining a feed passage between them; and
   B. circularly arranged means circumscribing a delabeling zone open to said passage including:
      a. a rotatably driven abrading member;
      b. a rotatably driven turning member adapted to supportively cooperate with a surface of the article being delabeled; and
      c. force-applying means.
2. The apparatus of claim 1 wherein one of said belts is yieldably loaded toward the other belt.
3. The apparatus of claim 1 including a tubular conduit slotted along its length, said belts being received in the slots and intersecting the open cross sectional area of said conduit.
4. The apparatus of claim 1 including a source of negative pressure communicating with the delabeling zone.
5. The apparatus of claim 1 wherein said abrading member is a wire brush with rigid bristles.
6. The apparatus of claim 1 wherein said driven turning member is a cylindrical roller having a resilient surface extending vertically beyond the abrading member.
7. The apparatus of claim 1 wherein said force-applying means include a plurality of yieldably biased spherical rollers freely movable in all directions.
8. The apparatus of claim 1 including shredding means in open communication with the delabeling zone.
9. The apparatus of claim 2 wherein the tubular conduit is substantially vertical and at least about 50 cm. long.
10. The apparatus of claim 5 wherein the abrading member is yieldably mounted toward the delabeling zone.
11. A dry process for delabeling axially symmetrical, lightweight plastic containers comprising the steps of:
   A. sequentially inserting said containers lengthwise to a tubular feed passage;
   B. driving the containers in the direction of their longitudinal axes along the feed passage toward a delabeling zone;
   C. rotating the containers about their axes after reaching said zone;
   D. abrading labels from the containers in the delabeling zone during said rotation;
   E. supporting the containers in a direction substantially perpendicular to their axes during said abrading and rotating; and
   F. air conveying the removal labels from said delabeling zone as released from the containers.
12. The process of claim 11 including the step of gravity discharging the delabeled containers from the delabeling zone.
13. The process of claim 11 wherein the container is a bottle made of resilient thermoplastic material.
14. The process of claim 11 wherein said air conveying is accomplished by exposing the delabeling zone to negative pressure.
15. The process of claim 11 wherein abrading is accomplished by forcibly rotating a brush with rigid bristles against the labeled surface of the container.
16. The process of claim 11 wherein the labels contain aluminum foil.
17. The process of claim 12 wherein said discharging is directly to a container size-reducing zone.
18. The process of claim 13 wherein the bottle weight is between 15 and 200 grams and the plastic has a flexural elastic modulus of at least about $7 \times 10^3$ kg/cm$^2$.

* * * * *